United States Patent [19]

Seeney et al.

[11] 4,396,431
[45] Aug. 2, 1983

[54] PROCESS FOR PREPARING OLIVINE SAND CORES AND MOLDS

[75] Inventors: Charles E. Seeney, Brazil; John F. Kraemer; Janis Ingebrigtsen, both of Terre Haute, all of Ind.

[73] Assignee: International Minerals & Chemical Corporation, Terre Haute, Ind.

[21] Appl. No.: 342,309

[22] Filed: Jan. 25, 1982

[51] Int. Cl.$^3$ .............................................. C04B 19/02
[52] U.S. Cl. ........................................ 106/74; 106/84; 106/85; 501/111; 501/112
[58] Field of Search ................ 106/74, 84, 85, 38.3, 106/38.9; 501/111, 112, 126; 423/306

[56] References Cited

U.S. PATENT DOCUMENTS

| | | | |
|---|---|---|---|
| 2,479,504 | 8/1949 | Moore et al. | 106/38.3 |
| 2,895,838 | 7/1959 | Ilenda | 106/38.3 |
| 3,316,106 | 4/1967 | Montague et al. | 501/112 |
| 4,265,845 | 5/1981 | Escher | 501/112 |

FOREIGN PATENT DOCUMENTS 538809  1/1977  U.S.S.R. .......................... 164/520

*Primary Examiner*—James Poer
*Attorney, Agent, or Firm*—Robert H. Dewey

[57] ABSTRACT

An inorganic cement binder for a foundry aggregate comprising, in combination, potassium olivine phosphate and as a hardener therefor, water, aqueous sodium silicate, or aqueous phosphoric acid.

9 Claims, No Drawings

PROCESS FOR PREPARING OLIVINE SAND CORES AND MOLDS

This invention relates to an improved process for preparing foundry cores and molds. In a particular aspect this invention relates to an improved binder for the aggregate and process for preparing it.

Binders for foundry aggregates used for making foundry cores and molds for metal castings are usually organic in nature, i.e. organic polymers and resins. These organic compounds are decomposed or volatilized when the molten metal contacts the core or mold and the resulting fumes and vapors cause a problem of air pollution. There is, therefore, a need to provide an all inorganic, non-volatile binder which is non-contaminating to the environment.

SUMMARY OF THE INVENTION

It is an object of this invention to provide an improved process for preparing foundry molds and cores using a foundry aggregate and an inorganic cement binder therefor.

It is another object of this invention to provide an improved binder for foundry aggregate and a process for preparing it.

Other objects of this invention will be apparent to those skilled in the art from the disclosure herein.

It is the discovery of this invention to provide an improved process for preparing foundry cores and molds using a foundry aggregate and an inorganic cement binder therefor. The improvement is provided by using as a binder the reaction product of a silico-phosphate, such as the reaction product of a metal dihydrogen phosphate, e.g. the zinc, or preferably, the potassium compound, with a mineral silicate, including but not limited to zeolites, nepheline syenite and preferably olivine. The preferred compound, the reaction product of potassium dihydrogen phosphate with olivine has, for convenience, been designated potassium olivine phosphate, or simply KOP. Water, aqueous sodium silicate or dilute phosphoric acid can be used as hardening agents for the binder.

DETAILED DISCUSSION

The metal silico-phosphate useful in the practice of this invention is easily prepared by mixing metal dihydrogen phosphate, e.g. potassium dihydrogen phosphate, with the mineral silicate, e.g. olivine and heating the mixture to above the melting point of the metal dihydrogen phosphate for about one hour. For example, potassium dihydrogen phosphate melts at about 810° C. and the zinc salt melts at about 1000° C. The mineral silicate should be comminuted, e.g. preferably to pass a 200 mesh sieve. The metal dihydrogen phosphate is preferably added as a dry powder, but it can also be added as an aqueous solution, e.g. a saturated solution, or as a slurry. The proportions of metal dihydrogen phosphate and mineral silicate are not critical, a range of 0.5–10:1 by weight respectively being useful. However, a proportion of about 2:1 by weight is preferred especially when the reactants are potassium dihydrogen phosphate and olivine.

During the heating process, the mixture forms a viscous polymeric melt. The metal dihydrogen phosphate is converted to metal polyphosphate which dissolves and reacts with the silicate, after which it is allowed to cool. As it cools it hardens and becomes increasingly brittle and after equilibration at room temperature and normal relative humidity (50%) it crumbles easily. The KOP should be prepared in a heat-resistant and acid-resistant vessel. Steel is rapidly attacked by the reaction mixture at elevated temperatures.

According to the process of this invention, the aggregate is preferably, but not necessarily, first mixed with ground KOP in an amount of about 2–12% based on the aggregate. After mixing the aggregate with the KOP, there is added the hardener with additional thorough mixing. The order of mixing is not critical but it has been found that mixing the dry ingredients first and then adding the liquid ingredients tends to ensure homogeneity of the final mixture. The mixture of aggregate, binder and hardener is now delivered to the mold or core box where it is permitted to cure for 2 hours or until a compressive strength of 50 psi is obtained using the Dietert tester. The core or mold is then removed and is allowed to further harden under ambient conditions for an hour or more or overnight.

The hardener used in the practice of this invention is water, aqueous sodium silicate or preferably an aqueous solution of phosphoric acid. From about 2% to about 10% of KOP based on the weight of the aggregate is used, and similarly from about 2% to about 10% of water or dilute phosphoric acid, e.g. 50%, is used. The purpose of the acid is to retard the cure rates. Thus the higher the concentration of the acid, the slower the rate of cure, and the concentration of the acid, the more rapid the cure rate. Under foundry conditions of 70°–85° F. and 70–85% relative humidity the preferred binder composition was KOP-$H_2O$-$H_3PO_4$ (50% black wet-process acid) in a ratio of 2:1:1 to 3:2:2.

The foundry aggregate useful in this practice of this invention can be any known aggregate such as silica sand, zircon, olivine, alumina silicate sand (zeolite), chromite sand, and the like. Olivine is a preferred aggregate. The aggregate should be of a particle size consistent with desired result.

The orthophosphoric acid used in the practice of this invention can be purified phosphoric acid, such as the 85% grade. Because of the economics, however, the preferred acid is wet process acid and can be the so-called black acid, but green acid is also useful, although it is rather dilute (about 30%) and may require longer curing time. Black acid is customarily about 54% concentration and can be used as is, or it can be further diluted, depending on curing time required.

The sodium silicate useful in the practice of this invention is not critical as to concentration. For convenience, it is preferred that it be of such concentration as to furnish the required amount of water.

Olivine sand is the preferred aggregate for use with the improved binder of this invention. It is a natural mineral consisting of a solid solution rich in magnesium orthosilicate (Fosterite) with a minor amount of ferric orthosilicate (Fayalite). Olivine is a major component of dunite rock. Typically, olivine has a composition falling within the following general ranges:
 $MgO$: 40–52% by weight
 $SiO_2$: 35–45% by weight
 $FeO$: 6.5–10% by weight
 $Al_2O_3$, $K_2O$, $Na_2O$: Trace
Any olivine falling within the above ranges is suitable for the practice of this invention.

The invention will be better understood with reference to the following examples. It is understood that these examples are intended only to illustrate the invention and it is not intended that the invention be limited thereby.

EXAMPLE 1

Potassium olivine phosphate (KOP) was prepared as follows. Olivine, comminuted to pass a 200 mesh sieve, and potassium dihydrogen phosphate were thoroughly mixed in a 1:1 dry weight ratio and the mixture was delivered to an alumina container. The mixture was then heated to over 805° C. for a period of time to allow the polymeric melt to form (½–3 hours). It was then allowed to cool, whereupon it crumbled easily. After removing the KOP from the container, it was broken up, ground and screened to −200 mesh using a pulverizer.

Material so prepared was then used as a binder for olivine sand. KOP 150 g was first mixed with the sand 1500 g, and water 75 g was added. The mixture was quickly packed into a Dietert Tensile Core Box which produces a "dog-bone" shaped core. After one hour the compressive strength was determined using a Dietert (454B) Mold Strength Tester. After standing overnight, the tensile strength was measured. The results are given in Table 1.

EXAMPLE 2

The experiment of Example 1 was repeated in all essential details except that a 50% solution of aqueous phosphoric acid was substituted for water to retard the cure rate. The results are given in Table 1.

EXAMPLE 3

The experiment of Example 1 was repeated in all essential details except that sodium silicate solution was substituted for the water. The sodium silicate used was No. 22 obtained from E. I. duPont de Nemours Company. It had a ratio of $SiO_2$ to $Na_2O$ of 1.90. The $SiO_2$ content was 28.5% and the $Na_2O$ content was 15.0%.

EXAMPLE 4

The experiment of Example 1 was repeated in all essential details except that the KOP was prepared from a 2:1 mixture of dihydrogen potassium phosphate and olivine. The results are given in Table 1.

EXAMPLE 5

The experiment of Example 1 was repeated in all essential details except that the KOP was prepared from a 3:1 mixture of potassium dihydrogen phosphate and olivine. The results are given in Table 1.

EXAMPLE 6

The experiment of Example 5 was repeated in all essential details except that 8% of KOP based on sand, and 4% water were used. The results are given in Table 1.

EXAMPLE 7

The experiment of Example 1 was repeated in all essential details except that the KOP was prepared from 6:1 mixture of $KH_2PO_4$ and olivine. The results are given in Table 1.

TABLE 1

| Example Number | Compressive Strength at 1 Hr | Tensile Strength |
| --- | --- | --- |
| 1 | 26 psi | 20 psi |
| 2 | 13 | 70 |
| 3 | 35 | 55 |
| 4 | 36 | 10 |
| 5 | 45 | 10 |
| 6 | 50+ | 8 |
| 7 | 16 | 20 |

EXAMPLE 8

The experiment of Example 5 was repeated in all essential details except that the binder consisted of KOP, water and phosphoric acid in a 2:1:1 ratio by weight and the amount added to the sand was sufficient to provide 6% KOP based on the weight of the sand. The temperature was 75° F. and the relative humidity 65%. The results are given in Table 2.

EXAMPLE 9

The experiment of Example 1 was repeated in all essential details except that the binder consisted of KOP, water and phosphoric acid in a 2:1:1 ratio by weight and the amount added to sand was sufficient to provide 6% KOP. The results are given in Table 2.

EXAMPLE 10

The experiment of Example 9 was repeated in all essential details except that the amount of binder added to the sand was sufficient to provide 3% KOP. The results are given in Table 2.

EXAMPLE 11

The experiment of Example 9 was repeated in all essential details except that the KOP was prepared by heating a 1:1:1 by weight ratio of potassium dihydrogen phosphate olivine and water at 850° C. for three hours. The mold was allowed to stand overnight and the tensile strength was measured. It was then heated at 900° C. for two hours and allowed to cool to room temperature at which time the tensile strength was again measured. The results are given in Table 2.

TABLE 2

| Example Number | KOP | 50% $H_3PO_4$ | Compressive Strength at 2 Hrs | Tensile Strength Pre* | Tensile Strength Post** |
| --- | --- | --- | --- | --- | --- |
| 8 | 6% | 6% | 40 psi | 160 psi | 65 psi |
| 9 | 6 | 5 | 40 | 170 | 60 |
| 10 | 3 | 3 | 25 | 105 | 10 |
| 11 | 6 | 6 | 10 | 130 | 50 |
| 12 | 3 | 3 | 10 | 70 | 30 |

*Before heating.
**After heating.

EXAMPLE 12

The experiment of Example 1 is repeated in all essential details except that a zeolite is substituted for olivine in the reaction with potassium dihydrogen phosphate. The mold thereby obtained has good compressive strength.

EXAMPLE 13

The experiment of Example 1 is repeated in all essential details except that nepheline syenite is substituted for olivine in the reaction with potassium dihydrogen phosphate. The mold thereby obtained has good compressive strength.

We claim:

1. An inorganic cement binder for a foundry aggregate comprising, in combination, potassium olivine phosphate, from 2 to 10% based on the weight of the aggregate, and as a hardener therefor from 2 to 10%, based on the weight of the aggregate, of water, aqueous sodium silicate, or aqueous phosphoric acid.

2. The combination of claim 1 wherein the hardener is water.

3. The combination of claim 1 wherein the hardener is aqueous sodium silicate.

4. The combination of claim 1 wherein the hardener is aqueous phosphoric acid.

5. A core or mold consisting essentially of a foundry aggregate and the binder-hardener combination of claim 1.

6. An inorganic cement binder for a foundry aggregate comprising, in combination, a metal silico-phosphate, from 2 to 10% based on the weight of the aggregate, and as a hardener therefor, from 2 to 10% based on the weight of the aggregate, of water, aqueous sodium silicate, or aqueous phosphoric acid.

7. The binder of claim 6 wherein the metal silico-phosphate is prepared from a zeolite, nepheline syenite or olivine and a metal dihydrogen phosphate.

8. The binder of claim 6 wherein the metal dihydrogen phosphate is potassium dihydrogen phosphate.

9. The binder of claim 6 wherein the metal dihydrogen phosphate is zinc dihydrogen phosphate.

* * * * *

UNITED STATES PATENT AND TRADEMARK OFFICE
CERTIFICATE OF CORRECTION

PATENT NO. : 4,396,431

DATED : August 2, 1983

INVENTOR(S) : Charles E. Seeney et al

It is certified that error appears in the above-identified patent and that said Letters Patent are hereby corrected as shown below:

Column 2, line 34, "this", first occurrence, should read
-- the --

Signed and Sealed this

Twenty-second Day of November 1983

[SEAL]

Attest:

GERALD J. MOSSINGHOFF

Attesting Officer        Commissioner of Patents and Trademarks